Sept. 18, 1951  A. G. LIEBMANN  2,567,954
AIRCRAFT LAUNCHING APPARATUS
Filed Dec. 1, 1947  7 Sheets-Sheet 1

INVENTOR
August Liebmann

Sept. 18, 1951 A. G. LIEBMANN 2,567,954
AIRCRAFT LAUNCHING APPARATUS
Filed Dec. 1, 1947 7 Sheets-Sheet 2

INVENTOR
August G. Liebmann

Sept. 18, 1951 A. G. LIEBMANN 2,567,954
AIRCRAFT LAUNCHING APPARATUS
Filed Dec. 1, 1947 7 Sheets-Sheet 4

August G. Liebmann
INVENTOR.

Sept. 18, 1951  A. G. LIEBMANN  2,567,954
AIRCRAFT LAUNCHING APPARATUS
Filed Dec. 1, 1947  7 Sheets-Sheet 5

August G. Liebmann
INVENTOR.

Patented Sept. 18, 1951

2,567,954

UNITED STATES PATENT OFFICE 2,567,954

AIRCRAFT LAUNCHING APPARATUS

August George Liebmann, Washington, D. C., assignor of one-half to Harry A. Blessing, Washington, D. C.

Application December 1, 1947, Serial No. 789,078

14 Claims. (Cl. 244—63)

The present invention relates to an aircraft launching apparatus to facilitate airtrain performance.

The primary object of the present invention is to facilitate the launching of motorless aircraft in tow line operations, by provision of a prime mover to overcome the high resistance and inertia of starting such aircraft in towing movements.

A further object is to provide a permanent railway in the conventional airstrip of an airfield runway, the prime mover comprising a truck supported for travel upon the railway and having a coupling means adapted to engage and work automatically in conjunction with coupled aircraft towing movements, thereby dispensing with the extra powered plane to assist the takeoff and sustentation of a loaded glider in tow, in conventional standards of practice. Thus one motorized plane can do what was formerly required of two motorized planes at an enormous saving in horsepower to attain sustentation simultaneously for such airtrains in towing relationship.

A further object of the invention is to provide a remote control means for starting the prime mover, by the pilot in the motorless aircraft and means in connection with such starting means to automatically disengage the coupling of prime mover to aircraft and stop the prime mover at predetermined distances upon the railway embedded within the runway.

The remote control means in conjunction with the prime mover and its operation in towing a motorless aircraft permits the following function of take-off of aircraft.

(1) Disengagement of prime mover at the critical point of roll and tail lift or flat climb when the aircraft can clear and pass over the prime mover, by automatic release of the tow coupling.

(2) Stopping the prime mover at a critical point on the railway in the runway by means of an emergency brake, automatically applied, to prevent rear end collision between prime mover and aircraft in case of a false start in launching, as well as stop the prime mover within the railway limits of the runway.

(3) Adequate traction means to overcome the excessive resistance to movement of soft aircraft tires when loaded, by provision of a rack and pinion starting section and a free rail running section, of the railway and the prime mover adapted to be operated thereon thus providing means for the heavy work of starting impact and quick acceleration of movement for take-off.

(4) The motorless aircraft considered is that type as converted from powered planes to gliders, and which have a high degree of values for aerodynamical characteristics as glider borne craft. These principles are essential to effect the economies for airtrain operation, of motored and motorless aircraft coupled and moved as airtrains.

A further object of the invention is to synchronize the take-off of motorless aircraft with that of the powered craft.

To visualize the performance of such an airtrain with say for example 12 tons of pay load to be towed in the airtrain in addition to sustentation of the train and the load carried by the powered plane, the following approximation is shown.

It is considered that the railway in the runway shall in this instance be of the following dimensions, more or less:

(a) Rack rail in addition to running rail, for the impact of starting, about 130 linear feet, with an accompaniment of the same distance of adhesive traction of the running rails.

(b) The track structure beyond the running rail and rack rail aforesaid shall be about 785 feet additional more or less.

(c) Of the linear feet of running rail extension above noted, about 495 feet is allowed for acceleration and 290 feet for stoppage of the prime mover.

The time synchronized to aerodynamical function for lift of motorless plane is considered as follows, more or less.

(1) From initial start to end of rack rail, 20 M. P. H.—13 sec.

(2) From initial start, plus headway run-rail, 27 M. P. H.—7.5 sec.

(3) From headway to speedway-running rail 40 M. P. H.—5.5 sec.

The elapsed time for such calculated pay load mentioned as 12 tons in tow, from start to disengagement of prime mover, 26 seconds.

Of course different pay loads and different craft and other factors such as head winds, etc. will greatly modify these conditions and the above calculations are in no way conclusive, but merely an index to that condition affecting the performance.

The prime mover is shunted off the runway when not in use, it is coupled and trains made up by ground forces, the fluid used is obtained from a generating plant on the airfield.

In take-off and launching the prime mover is driverless and riderless, it is controlled by the motorless plane pilot and otherwise automatically, after launching it is brought back to the conventional starting point under its own power, driven back by one of the crewmen of the field.

Further objects will appear in the specification and claims hereinafter referred to. In the accompanying drawings:

The driving axle of the locomotive provided with inside connected cranks, eccentric discs for throw of the valve gear, and a pinion wheel provided with teeth to interfit with apertures in the rack rail.

Reference being had to Figures 11 and 12, it will be noted that in the former the rack rail is seated upon a cross tie with a resilient shim interposed between the rail base and the cross-tie.

In the latter figure the rack rail is shown as having slots in dotted or broken lines, to prevent creeping of the rail in longitudinal direction when under stress of tractive effort.

Prebored holes in the cross tie being round, the fastening shank being virtually square its corners impinging in the round hole prevents any turning movement, the lug on the shank holds the resilient shim firmly to the cross tie, the slot as aforementioned prevents rail creeping, yet the upstanding head allows a recoil of the rail between rail flange and head to provide the pumping movement to the rack rail essential to yieldability to prevent rupture of the teeth of the pinion to the work of suddenly applied loads.

The dead lever remote control switch shown in this figure and in detail in Figures 20 and 21 controls the action of the circuit aforesaid.

With the critical point of acceleration and lift of the aircraft in towing movement, the working beam automatically disengages itself from the tow lug and circuit to the electro-pneumatic valve is broken thereby permitting valve to close and cutting off the fluid under pressure to the prime mover. At critical point of rise of aircraft and passing over the truck, the lug is dragged from the bifurcation of the working beam, which being pivoted, therefore the bifurcated end is oscillated toward the motion of the prime mover, and as the upper end aforesaid of the beam swings inwardly toward the prime mover, pushed by the recoil of the buffer spring of rubber on the opposite end of the beam which causes that end to swing outwardly, by this oscillatory movement the valve handle connected to the beam is swung in an orbital movement opening the fluid pressure valve to impart fluid under pressure to the braking system for stoppage of the truck of the prime mover.

Figures 1, 2:
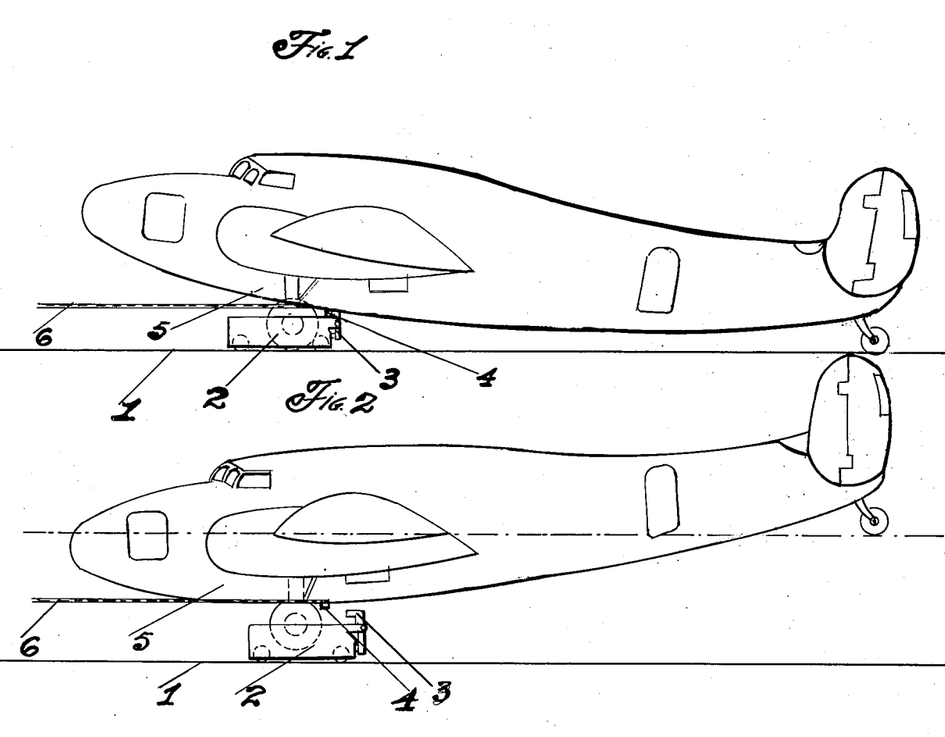
Figure 1 is a side elevation showing relative magnitude of a motorless aircraft in relation to launching means and in initial position for launching.
Figure 2 is a side elevation showing related magnitudes and attitudes of a towed motorless aircraft passing over the apparatus at take-off and the relative position of aircraft to launching apparatus.

Reference now being had to the numerals:

The railway 1 of the airfield runway upon which the truck 2 is mounted for travel, and which carries the working beam 3 for coupling engagement with a coupling lug 4 of the motorless aircraft 5 as shown in initial launching position in Figure 1.

The tow line 6 of suitable material and carriage, connecting the motorless aircraft 5 with the motive-powered aircraft 7 in conventional spaced relationship for towing and take-off from the runway.

Figures 3, 4:
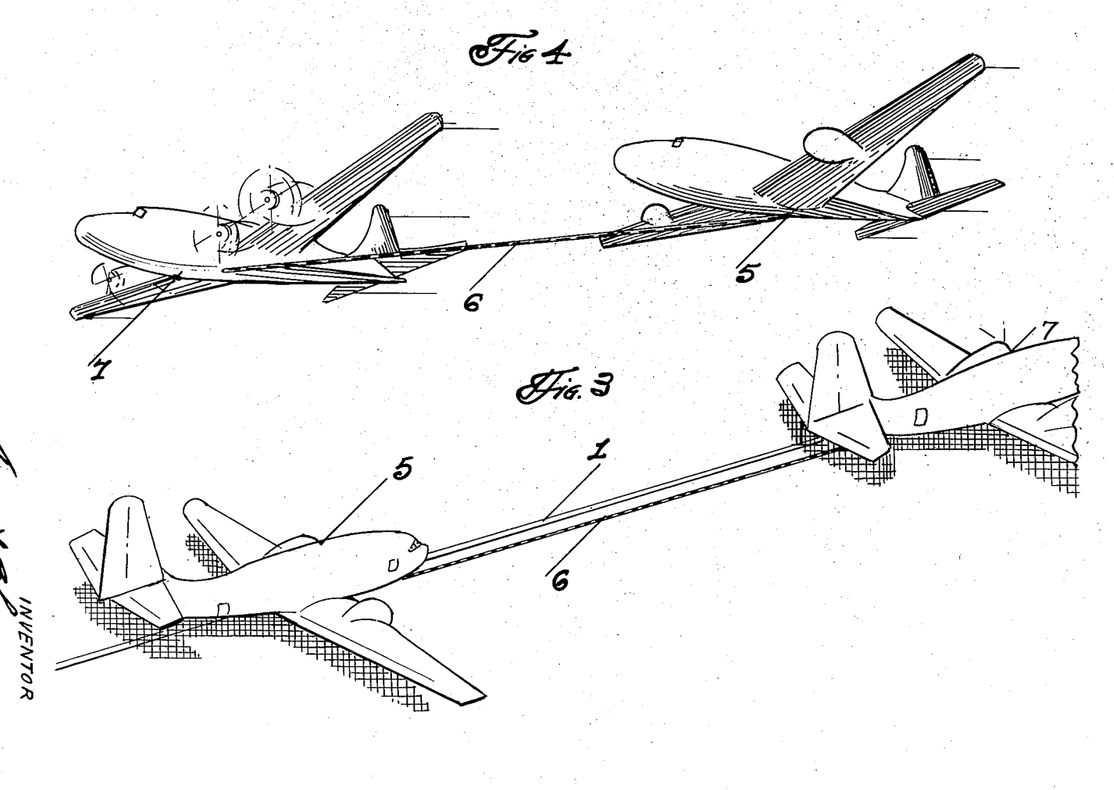
Figure 3 is a schematic perspective from the air to designate the airtrain coupled ready for take-off, on a conventional airstrip runway. The launching apparatus or prime mover thereof is not shown, being covered by the rearward aircraft.
Figure 4 is a schematic perspective from the ground designating such an airtrain in airborne relationship.
Figure 5:
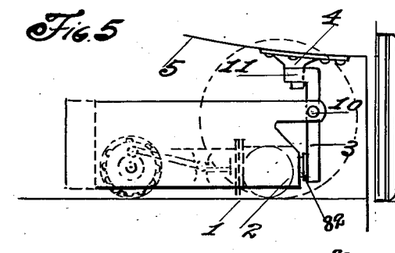
Figure 5 is a side elevation of the launching apparatus or prime mover showing the working beam coupling thereof, engaging a coupling lug of an aircraft.

The motorless aircraft 5 is set in motion by the truck 2 and at critical aerodynamical speed as shown in Figure 2 the motorless aircraft gains speed and momentum of ground roll and over rides the truck 2 as the tow line 6 is made taut by the pull thereon of the motive powered plane 7 and thus the truck 2 is left behind in the function of stopping by brake action, while the coupled aircraft in an airtrain become airborne as disclosed in Figure 4.

To achieve this function it should be noted that on the railway 1 embedded in the runway of the airfield the aircraft is brought to launching position its wheels astride the railway.

Figure 6:
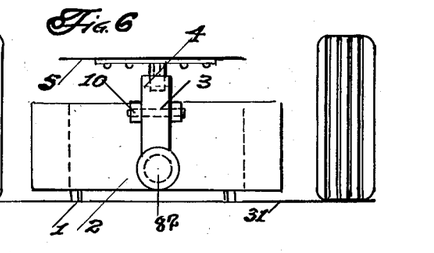
Figure 6 is a rear end elevation of the launching apparatus or prime mover in relation to landing wheels and height of under side of aircraft with relation to the runway surfaces.

The truck 2 of the prime mover is backed under the aircraft between the wheels to a suitably fixed position as shown in Fig. 6 for moving forward to engage the couplings as presently described.

The truck 2 of the prime mover having a substantially rectangular metal frame 8 with a rearwardly extending yoke 9, the latter pierced by a pivot pin 10 which carries the working beam 3.

The upper or coupling terminal end 11 of the beam being bifurcated for engagement with the coupling lug of the aircraft as noted. The truck is provided with axles and bearings 12 and 13 interfitting for turning movement within or below the frame 8, the axle 12 with wheels 14 is provided with cranks 15 engaged by pitman rods 16 connected with the rods 17 of the pistons 18 which operate in the cylinders 19 of the fluid pressure motor 2A of the prime mover 2 and which is indicated in general by the numeral 2'.

This motor constitutes the means for moving the truck forward or in reverse direction, and the reciprocation of the pistons in the cylinders of the motor transmitting motion through the pitman rods 16 to the axle 12 and through cranks 15 to the wheels 14.

The motor 2A of the prime mover or truck 2 is preferably operated through the medium of compressed air to avoid fire hazards.

The admission of air to and the exhaust of air from the cylinders 19 of the motor 2A is automatically controlled by the slide valves which will now be described.

Each cylinder 19 of the motor is provided in its outer side with ports 20 and 21 which provide for the intake of the compressed air and the exhaust thereof.

This side wall of each cylinder is formed to provide a valve chest 22 closed by a cover plate 23 having an exhaust port 24 formed therein at a point intermediate of its ends.

Figures 7, 8, 9, 10:
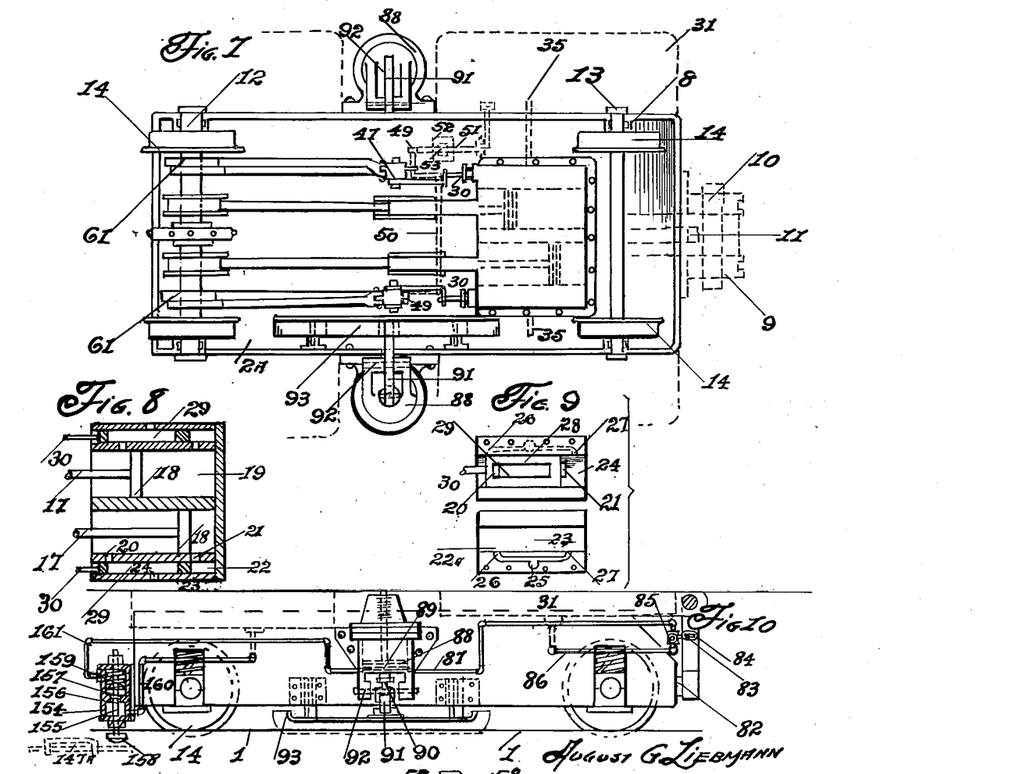
Figure 7 is an inverted plan of the prime mover of the launching apparatus being a truck supported for travel and means for imparting travel to the truck in a forward or reversed direction. The prime mover is provided with driving wheels, traction and pinion wheel and all appurtenances required in locomotive traction and brakes for stopping the same.
Figure 8 is the locomotive engine cylinders in plan and section of the prime mover, showing related piston and valve movements.
Figure 9 is a side elevation showing the valve motion.
Figure 10 is a side elevation showing a fragment of the prime mover, at rear end of the truck the working beam is shown. The automatic air brake at the center of truck and auxiliary emergency valve to actuate this control by means of an interchangeable track ramp.
Figure 10A:
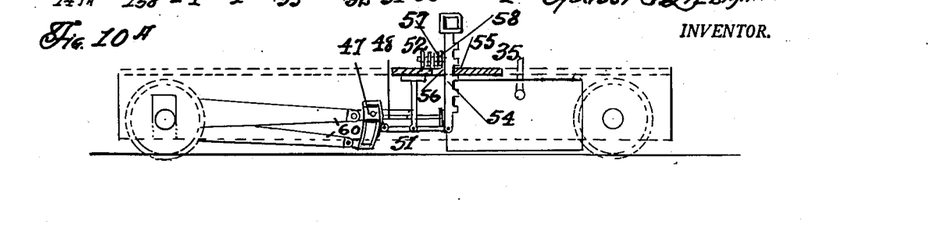
Figure 10A is a side elevation of the prime mover showing the reversing gear for the valve motion of the locomotive function.

The cover plate 23 is recessed as indicated by the numeral 22 to receive the slide valve which will be presently described, and the same plate is formed with an intake port 25 and in its inner face with passages 26 and 27 which lead in opposite directions and open through the upper walls of the recess 24 as clearly shown in Figure 9 of the drawings.

The slide valve above referred to is indicated in general by the numeral 28 and the said valve is of grid formation and has a longitudinally extending opening or chamber 29, the valve being fitted for reciprocation of motion within the chest 22, and recess 22A.

The rod of the valve is indicated by the numeral 30 and the said rod connected with the link motion to be presently described.

By reference to the upper view of the Figure 9 it will be observed that when the valve 28 is at the left hand end of the stroke its upper side will close the passage 26 but its rear end will clear the passage 27; likewise, when the valve is in this position both ports 20 and 21 will be uncovered and the port 20 will be located within the bounds of the opening 29 of the valve, the port 20 being located immediately behind the rear of the valve.

With the valve in this position, air under pressure will exhaust from the respective cylinder 19 by way of the port 26, opening 29 and port 23; air being admitted at the opposite side of the piston head through the passage 27 and the port 20, of course, when the valve is shifted to the right in the said view of Figure 9, the passage 26 will be uncovered and the port 20 will be located beyond the forward end of the valve, and the port 21 will be located within the bounds of the opening 29 of the valve, the passage 27 being closed.

With the valve moved to this position air will exhaust from the respective cylinder 19 at the last mentioned side of the piston by way of the said port 20, opening 29, and port 23. Air under pressure being admitted to the opposite end of the cylinder through the passage 26 and the port 20.

It will be observed that the ports 20 and 21 constitute both intake and exhaust ports in the operation of the slide valve.

Air is supplied to the motor 2A of the prime mover truck 2 from compressed air tanks 31 carried by the truck, said tanks being charged from a stationary compressor plant on the environs of the landing area of the airfield.

Figure 18:
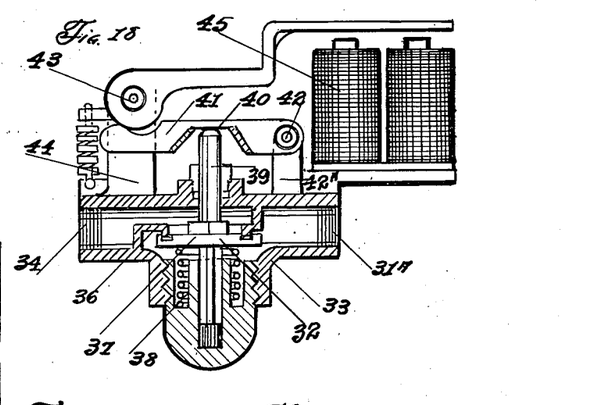
Figure 18 is a cross sectional view of the electro-pneumatic valve taken on its longitudinal axis, with the electro-magnet for opening the valve downwardly against a head of fluid under pressure and impart fluid pressure to the prime mover to impart travel to the truck for its towing movement, and operably connected to the elements disclosed in Figures 17, 20, and 21 aforesaid.
Figure 19:
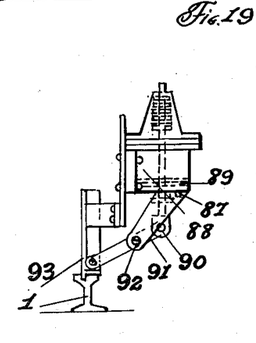
Figure 19 is the brake mechanism in elevation with respect to the brake cylinder, leverage, rail shoe. This rail shoe for braking on the rail is held for vertical movement in guides inside of the truck frame of the prime mover and the brake cylinder with piston and rod that move upwardly to compound the leverage to impinge the shoe against the rail, which is composed of an angular structure one leg of the angle travelling in the flangeway or groove of the running rail, the brake lever passing under the lower edge of the truck frame. In plan inverted shown in Figure 7, while only one cylinder is shown coupled it is sufficient to disclose the method.

The supply of air or fluid to operate the motor is controlled by the electro-pneumatic valve shown most clearly in Figure 18 of the drawings and indicated in general by the numeral 32.

The said valve comprising a casing 33 to be mounted upon the truck 2 at any convenient point to supply fluid under pressure to the motor 2A with an inlet port 34 to which is connected an air conducting pipe 35 Figure 7 of the drawings.

The feed inlet of the valve 31A is connected to the fluid pressure tanks 31. The interior of the valve casing 33 is formed with a valve seat 36 against which rests the valve 37 normally held closed by a spring 38 bearing upon its lower side, the valve being arranged to open in a downward direction against the fluid under pressure, and being provided with an upwardly extending stem 39 passing through the valve casing and abutting a recess connection in a lever as at 40, within the lower side of said lever 41, mounted for deflective movement as at 42, and adapted to be actuated by an eccentric lever as at 43.

At its opposite ends the valve casing 33 is provided with upstanding lugs 42A and 44 to carry the levers 41 and 43 aforesaid, for deflecting and opening the valve.

The electro-magnet 45 is attached to the valve casing to actuate the levers 43 and 41 to depress the stem 39 and open the valve 37.

It will be understood that when the valve 37 is lowered from its seat 36, the fluid under pressure entering the valve casing at 31A will pass the valve 37 to be conducted by the pipe 46 to the valve chest 29 of the two cylinders of the motor, as hereinbefore described thus setting the motor in motion for travel.

Figure 11:
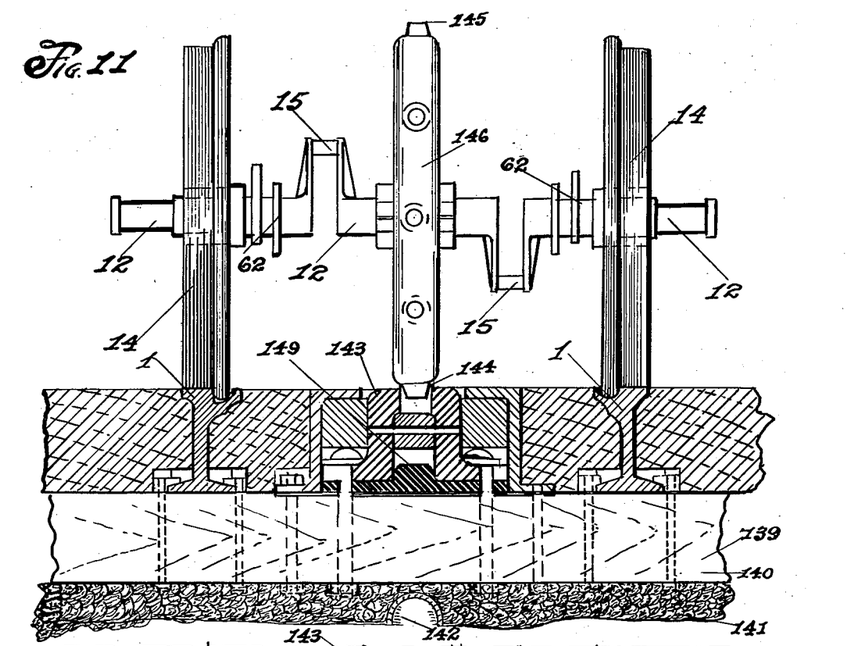
Figure 11 is a cross-section transversely of the railway and runway, countersunk to avoid interference with aircraft wheel movements.
Figures 12, 13, 14:
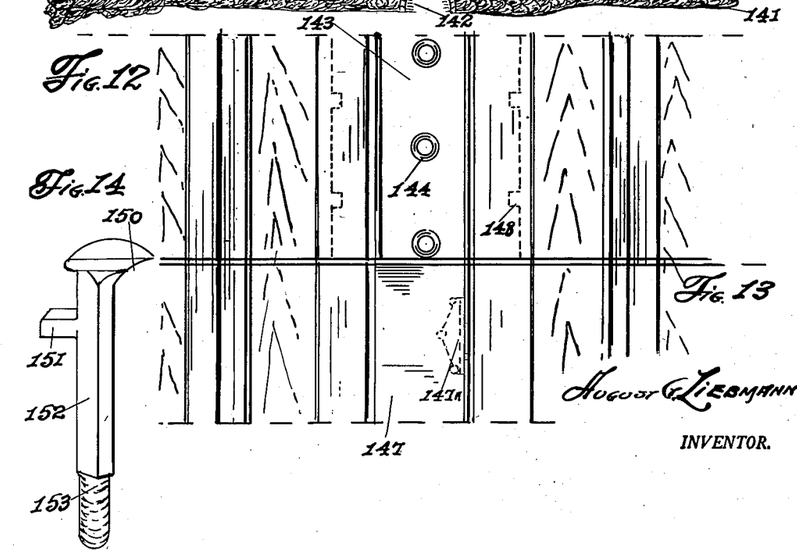
Figure 12 is a top plan view of structure shown in Figure 11.
Figure 13 is a top plan view of the structure extending beyond the rack section of the railway, utilizing a box rail of lesser height to permit free rotation of the pinion.
Figure 14 is a type of rail fastening for the rack rail. This is composed of a straight shank of rectangular form, having a conventional track spike head upon one end, a threaded portion on the opposite end adapted to receive a threaded nut, and a lug extension in opposite direction to the spike head, said lug disposed intermediate of its ends aforesaid.

The speed, control and direction of travel of the truck 2 is of course adapted to the railway I and its constituent elements of traction as shown in Figures 11, 12, and 13 of the drawings and hereinafter more fully described.

The link motion controlling the valve travel of the motor, above referred to for operating the slide valve 28, Figure 9, includes link blocks 47 with which are slidably connected arms 48 extending forwardly from and carried by the valve rods 30. These link blocks 47 are supported upon the crank ends 49 of a rock shaft 50, shown in broken lines in Figure 7, and mounted below the bed plate frame of the motor 2, it being understood that the link blocks 47 will be raised or lowered upon rocking the said shaft 50 to reverse the motion of the valve travel and incidentally the motor.

In order that the rocking movement of the shaft may be had, a rocker arm 51 is mounted upon a bracket 52 and is pivotally connected at one end as at 53 with one crank end of the shaft 50 as shown in Figure 7 of the drawings.

The rocker arm 54 slidably mounted through a bearing plate 55 upon the truck 2A passing through a slot 56 and having its teeth engageable interchangeably with one end of the wall of the slot.

In order to hold the rock bar in position with its teeth engaging the wall of the slot, a thrust pin 57 is mounted upon the plate 55 and is caused to normally bear yieldably against one side of the rocker arm 54 by means of the spring 58 mounted upon it.

The numeral 60 indicates link rods connected with the link blocks 47 and at their opposite ends with eccentric straps 61 to engage eccentric discs 62 on the crank axle 12.

It will now be evident that as the axle is rotated, oscillatory motion will be imparted to the link blocks and transmitted to the slide valve 28 by raising and lowering the links to the medium of levers 54 the motion is reversed.

Figure 20:
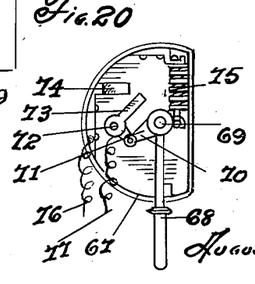
Figure 20 is a top plan view and Figure 21 elevation in section of the remote control switch placed in the motorless plane to control the working of the prime mover for take-off movement of launching the motorless plane previously described.
Figure 21:
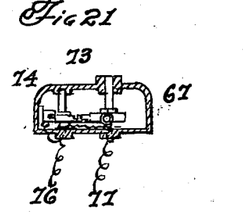
Figures 22, 23:
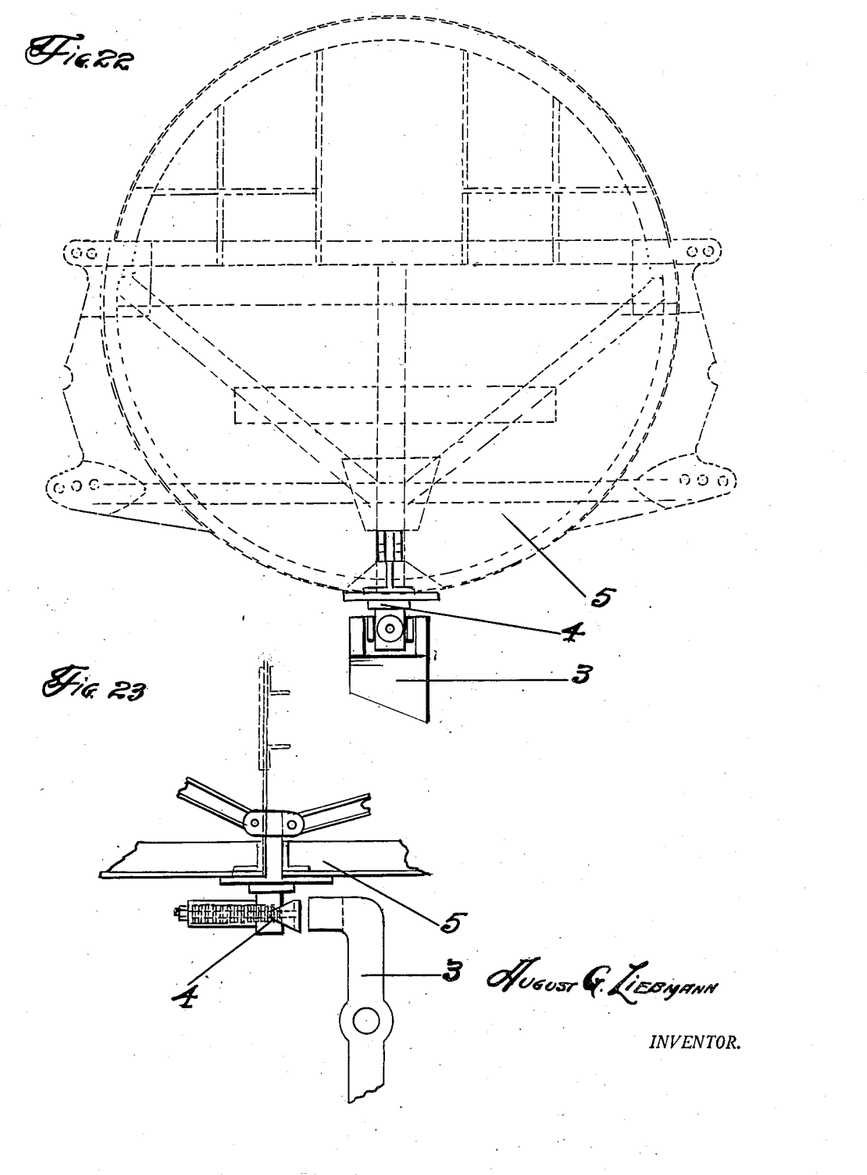
Figure 22 is a diagram transversely of an aircraft fuselage, taken adjacent to the junction of structure of an aircraft bulkhead adjacent to the wing abutments, with relative location of draft gear and coupling of the tow lug of the aircraft and the working beam of the launching truck.
Figure 23 is a schematic diagram showing fragmentary elements of strut-tie members of an aircraft in side elevation adapted to cooperate with an air frame or hull, adjacent to the center of gravity thereof, yet varying with design of craft and also the shock absorbing tow lug in connection therewith adapted to interfit with the bifurcated coupling of the working beam, of the launching truck.
Figures 24, 26:
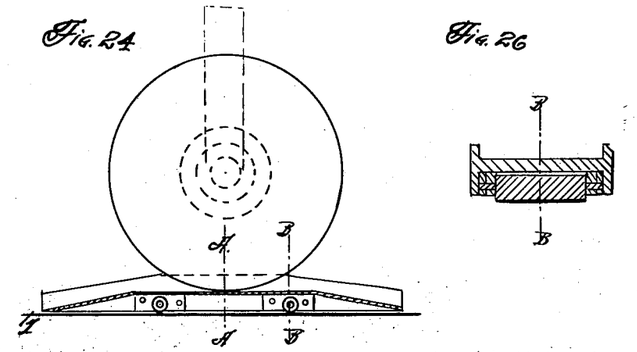
Figure 24 is a side elevation in section of a movable ramp, or anti-friction roller commonly known as a dolly, having a landing wheel positioned thereon.
Figure 26 is a cross section of Figure 24 on line B—B.
Figure 25:
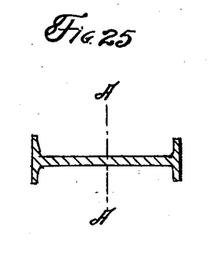
Figure 25 is a cross section of Figure 24 on line A—A.
Figure 27:
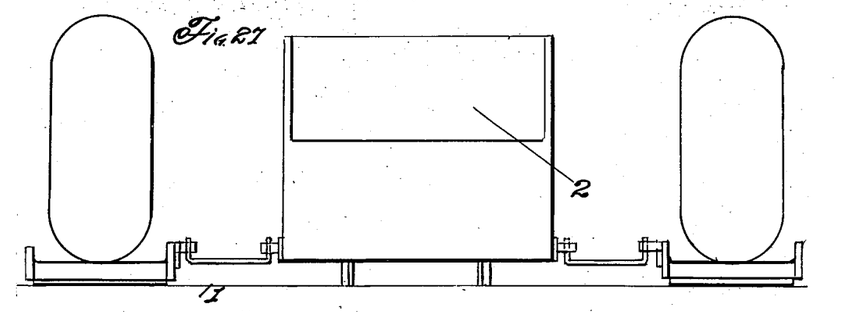
Figure 27 is an end view of the dollies in elevation with their relation to aircraft landing wheels superposed thereon.
Figure 28:
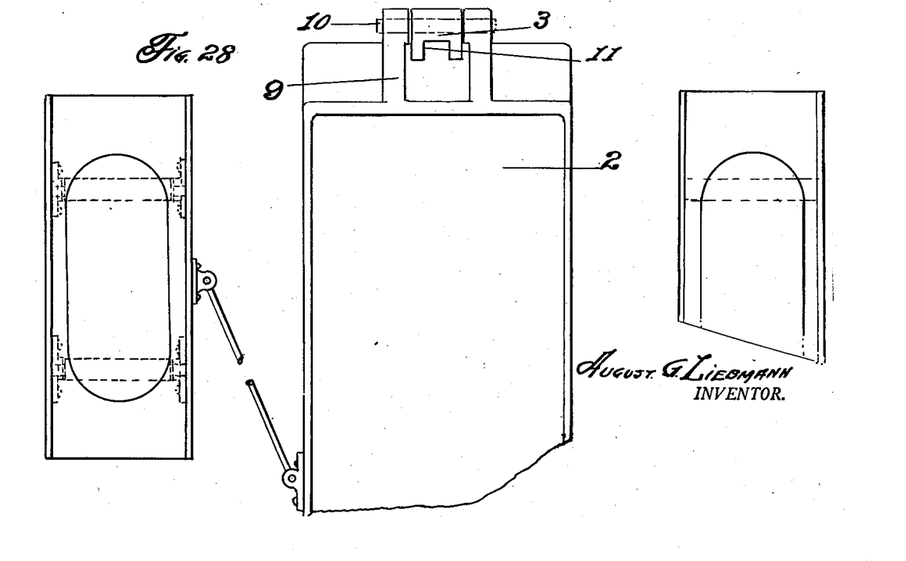
Figure 28 is a top plan view of Figure 27 in fragmentary form. These dollies greatly reduce the resistance of starting and rolling friction. They may be hitched or allowed to cast off and idle.

Reference being had to the working beam designated by the numeral 3 the coupling terminal having a contact for an electric circuit as at 65 for coupling to the lug 4 of the aircraft also provided with a contact for the said electric circuit as at 66, the registry of which completes the upper branch of the circuit through the control switch 67 as shown in Figures 20 and 21.

A storage battery for activating this circuit may be placed on either aircraft or prime mover.

The circuit 65 on the working beam 3 completes the branch including the electromagnetic control valve for the fluid pressure to the prime mover, and made a part thereof.

With reference to the remote control by the circuit elements, in normal conditions the lever 68 is pivoted on a shaft 69 for oscillatory movement, affixed to the lever is a crank arm 70 connected by a pin 71 to an insulated switch point 73, held for rotation by a shaft 72 forming one leg of the circuit designated by numeral 77. The movement of the elements 68, 70 and 73 bring the switch point in contact with the terminal 74 and thus close the circuit within the remote control switch 67 and connecting with the terminals elements designated by numerals 76 and 77.

Figure 17:
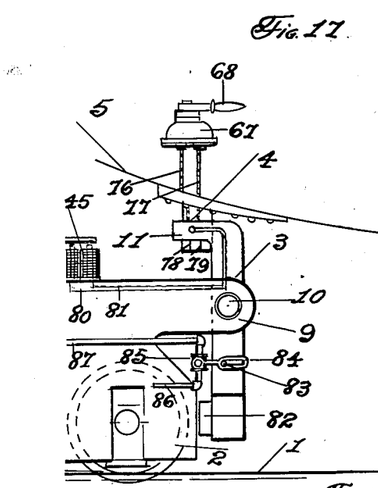
Figure 17 is a side elevation of the rear of the truck of the prime mover showing general spaced relation of same to the bottom of an aircraft hull, an electric circuit control for operation by the motorless plane or glider pilot, the working beam with end terminal bifurcated to conjoin with the coupling lug of an aircraft, contact points on the bifurcation and the lug for an electric circuit for a low voltage storage battery (not shown) to activate the circuit for the control of the electro-pneumatic valve as shown in Figure 18.

By reference to Figure 17 of the drawings it will be understood that the terminals designated 76 and 77 are lodged in the contact points of the aircraft towing lug 4 and therein designated as at numerals 78 and 79, thus when the bifurcated end of the working beam is coupled the contact elements as at 80 and 81 complete the circuit and change the magnet to open the valve to impart fluid under pressure to the motor.

Thus when the remote control lever 68 is swung to the left the circuit is complete and the branch to the battery (not shown) included, thereby activates the electropneumatic valve as stated.

At a critical point of acceleration the pilot of the motorless aircraft will allow break of contact at points designated by numerals 73 and 74, and failure to manually break contact, the rise of aircraft will otherwise break contact by withdrawal of lug from working beam and break contacts in lug designated by numerals as at 78 and 79, thus automatically breaking the circuit to the magnet designated as at 80 and 81, Figure 17, either of which circuit break closes the valve that feeds fluid under pressure to the prime mover.

The recoil of the rubber spring 82 of the working beam oscillates the lower end of the same for orbital movement. The dowel pin lodged in the working beam as of numeral 83 swings the valve lever 84 thus opening the fluid pressure valve 85 imparting fluid under pressure from the tank 31 through branch pipe 86 to the brake pipe 87 feeding the brake cylinder 88 and lifting the piston therein 89 and piston rod 90 connected therewith to the lever 91 pivoted midway on the bracket extension 92 of the cylinder and the opposite end of the lever coupled to the rail brake shoe as at 93 to exert braking pressure on the rail for the stoppage of the prime mover and truck 2.

Figure 15:
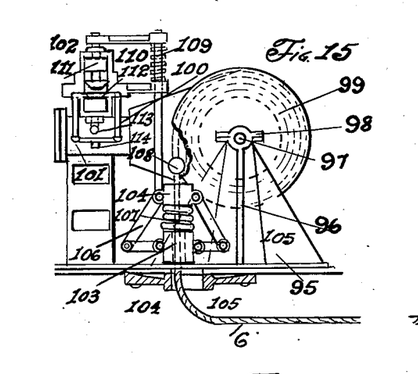
Figure 15 is a side elevation of the reel for handling the tow line, it being pneumatically operated, with a slide valve system as disclosed in Figure 9 and preferably mounted in the powered tow plane. The reel is provided with a shock absorbing fixture to carry the shock of slack running in and out, and to keep the tow line taut as hereinafter more fully described.
Figure 16:
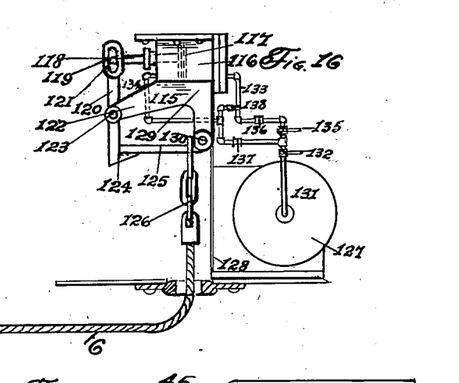
Figure 16 is a side elevation of a cable coupling for a towing line as disposed upon the motorless aircraft, the coupling is held closed and/or opened for release of tow line in casting off; by piston and cylinder under fluid pressure locked within, by exhausting the pressure the end of tow line is released for winding on the element disclosed in the preceding figure.

Reference now being had to the tow line tackle system as shown in Figures 15 and 16 of the drawings:

The windlass designated in general by the numeral 95 is anchored to a substantial part of an aircraft frame of the motored aircraft, the windlass having standards 96 for the holding for rotary movement of the journals 97 in the pillow blocks 98; the drum 99 of conventional form for winding is carried by the journaled shafts 97, a fluid pressure motor designated in general as the numeral 100 having a cylinder 101 with pistons, rods, valve chest and valve gear as applied to the motor in Figure 7 previously described.

The windlass and engine of a fluid pressure motor serves as a winding engine to keep the cable taut and prevent undue slack in towing operation both in launching and subsequent airtrain movements.

The governor for the windlass designated in general by the numeral 103 composed of a toggle arrangement to grip the cable and automatically release the same, the tow line passing through apertured blocks held by the toggles designated in general as by numeral 106 a compression spring disposed to hold the apertured blocks, the spring designated in general by the numeral 107 to hold the blocks in spaced relationship.

The towing line 6 wound upon the drum 99 is payed out to the proper length for towing aircraft, the drum operably connected to the driving motor for winding and the tow line provided with a stop element affixed thereto designated by the numeral 108 which impinges upon the toggle and apertured blocks of the governor 103 as a shock absorber, the valve stem moving the weighted valve 111 downward upon its seat 112 and cutting off the pressure from the valve chest 113.

When slack occurs in tow line 6 the valve lever 109 is released and consequently weighted valve 111 is raised from its seat 112 and pressure is imparted through the port 113.

It being understood that the intake of fluid under pressure as at 114 to feed the branch pipes being connected to the source of pressure when operating the same.

The other end of the tow line is coupled for engagement and disengagement to an assemblage designated in general by the numeral 115 and disposed in a convenient and upon a substantial part of the airframe of a motorless plane. The assemblage 115 consists of a fluid pressure cylinder 116, a piston 117, a rod connected therewith designated 118 an eye knuckle 119 which is bifurcated to fit the end of the lever 120 for swivelling movement and connected to the lever by a dowel pin 121 and made fast therein to permit tolerance of the lever throw to the throw of the piston.

The lever is pivoted intermediate of its ends to a bracket yoke 122 integral with the cylinder frame structure and carried by a fixed dowel pin 123, the lower end of the lever is formed with a hook extension 124 to hold in fixed engagement the lock link 125 which carries the swivelling links 126 permanently affixed to the tow line 6.

A fluid pressure reservoir 127 fixed to the assemblage and airframe of an aircraft designated in general as 128 in conjunction with the coupling assemblage 115. By manual operation the coupling is arranged and made with facility when the aircraft is at rest, this coupling being specifically an anchorage for towing movement and means for casting off the tow line when hauling a heavy load in flight.

The swivelling links 126 being coupled to the lock link 125 which is held pivotally at one end by an integral arm 129 of the unit 115 and held for orbital swinging movement by the pin 130.

The normal position of the piston 117 in the cylinder 116 is virtually intermediate of its ends as shown in the drawings. While in towing movement the piston is locked in this position by the balanced fluid under pressure on both sides of the piston 117 in the cylinder 116.

The fluid pressure supply pipe for the sequence of operation is connected to the reservoir 127 holding fluid under pressure which is controlled by a cut-off cock 132 connecting the fluid pressure supply pipe to the branch pipes 133 and feeding the rear end of the cylinder 116 as at 133 and the forward end as at 134 thus holding the piston 117 midway of the cylinder as shown in the drawings.

To charge the cylinder and hold the piston and its connected assemblage in a locked position as shown in the drawings, the fluid under pressure passes through cock 132 and the three-way cock 135, this cock being in open alignment but passage of the fluid pressure is blocked by the flap check valve 136 of the branch line 133, the pressure then builds up and opens and passes through the spring weighted check valve 137 and the by-pass check valve 138 feeding and equalizing the piston and the pressure on both sides from both ends of the cylinder 116.

By opening the three-way cock 135, to permit exhaust, the pressure is drawn from the rear end of the cylinder through the reversal of flow through the flap check valve 136 and the by-pass check valve 138 which being weighted permits pressure to pass through the branch pipe 134 and cause piston to travel, piston 117 to end of cylinder 116, thus rocking the lever on its pivot 123 and carried by bracket 122, thereby disengaging the hook 124 and dropping the lock link 126, releasing the swivelling links and the tow line 6, the latter automatically wound up on the reel as shown in the drawings in Figure 15.

Reference now being had to the railway in the runway of an airfield as shown in Figures 11, 12, 13 and 14 of the drawings.

A paradoxical situation resides in the landing gear of aircraft which is a controlling factor in commercial aviation.

The shock of landing is absorbed by the tire and the rate of internal pressure on its walls, of course, tends to increase or decrease the shock of landing.

For example a commercial transport plane of the average rating of weight has a static load to exert about 70 pounds per square inch on tire print area in contact with pavement, the area of print at rest being about 800 square inches for the contacting of tire and pavement surfaces.

A similar aircraft when landing has an average pressure at initial impact of about 42 pounds per square inch but spread over a tire area of about 1300 inches of contact area of tire and the pavement. When this landing impact is increased to 85 pounds per square inch, the result is a "crash landing."

This situation is serious in starting an aircraft, motorized or not, but when towing operation is undertaken this difficulty is greatly multiplied.

The frictional resistance to traction is such that an excess of thousands of horsepower is required to lift a towed aircraft into sustentation.

To increase the stiffness of the tire by internal pressure to reduce the frictional resistance and save the many thousands of excess horsepower needed temporarily to achieve sustentation induces greater defects.

(1) Increasing the ratio of landing shock which is already too high.

(2) Hazard and probability of bursting of tires at altitude due to the high internal air pressure of inflation and the low exterior atmospheric pressure.

Obviously the harder the tire on contact with the runway the resistance to traction on a standard surface is greatly reduced.

The draw bar pull or tow line pull to launch and tow a tethered motorless plane needs two motorized planes to gain sustentation and pay load for both planes and the motorless plane, which requires the work of about eight motors, for take-off expending eight to sixteen thousand horse power. Of course a plane of four motors can have this benefit of reduction when the whole becomes air borne, one of the motorized planes returning to base. The present invention dispenses with one of the motor planes.

Obviously the tractive effort exerted is several hundred pounds per ton of weight rolling on the pavement prior to lift.

When compared to the tractive effort of a locomotive on a railway which is about seven pounds per ton on a level, it is obvious as to the great disadvantage of conventional standards and the economic waste which precludes the utility of towing in practice at the present time.

To economize on the horsepower wasted in starting and lifting motorless aircraft, yet to obtain the aerodynamical advantages of the low draw bar pull of such an aircraft when lifted and airborne, it is quite necessary to overcome the ground resistance to traction, by cheap and effective methods as reside in the present invention.

The rails 1, preferably of the groove type as used in general with pavement construction for tramways, are fixed to creosoted cross-ties 139 and secured by fastenings 140 supported by a course of pavement 141 having a drainage conduit 142 for collecting any seepage of water, and general drainage of the railway and runway to prevent deterioration.

The railway in general comprising the traction rails for carrying the truck 2 for the entire length of the railway, the track gage may be narrow meter or standard, and between these running rails for a short distance, a box girder rolled section 143 provided with suitably drilled aperture 144 forming a rack rail essential for starting impact to enable towing movement. As in a railway train the slack impact of the first car, is a "come along" for each following car until all are in motion, it is the secret of train operation, without it, no train could ever be started.

The rack rail section of the railway, provides the essential tractive means by the interfitting engagement of the teeth 145 on the pinion drive wheel 146 for the necessary impact in starting function to render such airtrain movement an economic asset and the demonstration of earning power essential to prevent the obsolescence of commercial aviation.

The total railway length in the surface of an airway need not exceed one-sixth of the total runway requirement, and may be permanently fixed in one or both ends of the airstrips.

As the rack rail section is about one-fifth of the total linear feet of the railway, the line extending beyond the rack section, known as the accelerating and stopping sections previously described is supplied with a conventional rolled channel 147 as shown in Figure 13 of the drawings.

This is made necessary by reason of the pinion which must rotate freely in the accelerating section, beyond the limit of the terminal of the rack section.

Furthermore, in provision for the clearance of the pinion, the channel is provided with apertures at spaced distances for holding a ramp 147A, to control the run through the emergency valve as previously described.

The rack rail 143 has notches 148 cut in the flanges of the rail to prevent creeping of this rail when under stress of tractive effort. The resilient cushion 149 interposed between the base flanges of the rail and the cross tie support to permit the proper deflection and recoil of rail essential for further yielding moment of the rail to prevent stripping teeth from the pinion when working under its pulling and impact stress of starting and moving the towed loads. The spike head 150 may stand slightly above the rail flange to provide the tolerance specified in the foregoing, while the lug on the spike designated as at 151 secures the shim of resilient material, and holds same to the surface of the cross tie yet allowing the rail to deflect and recoil to permit the needed tolerance, the shank of the spike or rail holding means when inserted into a round hole of slightly lesser diameter, is thus held against turning movement being substantially square its edges impinge in the hole, the lower end of the fastening being threaded for a nut to hold the cushion and fastening secured in the cross tie.

The emergency valve designated in general by the numeral 154 is placed on the front end of the truck 2 in Figure 10 and the activating ramp 147A in substance a portable frog similar to a pressed shell of the conventional car re-railer on railways, this ramp is provided with lugs to interfit in the channeled section of the railway extending beyond the rack rail section.

The emergency valve 154 being a casing fixed to the truck, having a stem 155, a valve seat 156, a valve 157 and a buffer 158, when the latter comes into contact with the ramp 147A the stem 155 is compressed against a heavy coil spring 159 which permits fluid under pressure to pass from branch pipe 160 through the unseated valve 157 and through the branch pipe 161 to the brake cylinder as hereinbefore described.

Having thus described the invention, what is claimed as new is:

1. An aircraft launching apparatus, comprising a fixed railway in an airstrip runway; a locomobile adapted to the railway, provided with a means for conventional traction by frictional adhesion and a rack and pinion means to augment the traction; the dual means providing adequate and rapid travel of the locomobile upon the railway; a coupling beam mounted upon the locomobile, the said means adapted to engage a coupling lug upon an aircraft for its launching movement; an electro-pneumatic control means in cooperation with the locomobile and the aircraft, to actuate the launching movement, from within the aircraft; for the mean effective take-off of the aircraft from the runway; the take-off thereby actuating the coupling beam and the electro-pneumatic control means on the locomobile for the automatic stoppage of the locomobile upon the railway.

2. An aircraft launching apparatus, comprising a locomobile having a truck supported for travel upon a railway, embedded in an airstrip runway; fluid pressure means for imparting travel to the truck, a working beam pivotally mounted upon the truck, a coupling on the working beam adapted to interfit and engage a lug for towing on the aircraft; the said lug disposed in proximity to the nominal zone of centers of gravity of the aircraft; an electrical circuit means upon the truck and aircraft, adapted to be coupled by the intervening working beam; said circuit adapted to actuate the fluid pressure control means from within the aircraft; for the travel of the truck when in coupled towing engagement of the working beam with the lug of the aircraft; and for mean effective take-off of the aircraft from the runway, the take-off automatically uncoupling the working beam and actuating the fluid pressure means to retard and stop the locomobile upon the railway.

3. An aircraft launching apparatus, comprising a rack type railway in the surface of an airfield runway; a locomobile thereon having a truck supported for travel and provided with means complementary on the truck and railway for rapid transit traction of the truck; a working beam pivotally mounted upon the truck, for oscillatory movement, a coupling for aircraft upon one end of the working beam, a resilient buffer, comprising a shock absorber, on the other end of the working beam, and a fluid pressure motor carried by the truck to impart rapid transit towing movement to the truck and an aircraft, when coupled to the working beam, for the mean effective take-off, in launching the aircraft from the runway; the take-off actuating the working beam and fluid pressure means in cooperation therewith; for the automatic stoppage of the locomobile upon the railway.

4. An aircraft launching apparatus, comprising a conventional frictional adhesion type railway, provided with a supplementary rack type element in cooperation therewith; the dual elements for traction comprising a railway, the whole embedded in an airstrip runway; a locomobile thereon, having a truck supported for travel, fluid pressure means to impart travel to the truck; a working beam pivotally mounted upon the truck, one end of the said working beam provided with a resilient buffer, the opposite end provided with means for coupling to an aircraft; the truck actuated by conventional fluid pressure of the non-inflammable type; to impart rapid transit traction of the locomobile, for towing and the mean effective take-off of an aircraft in launching it from the runway; the take-off actuating the working beam and fluid pressure means controlled thereby, for the automatic stoppage of the locomobile upon the railway.

5. An aircraft launching apparatus, comprising a rack type tractive element and a frictional adhesion tractive element of a conventional railway, embedded in an airstrip runway; a locomobile thereon, having a truck assemblage for travel, fluid pressure means to impart travel to the truck, the said propulsion means for the travel of the truck, adapted to complement the essential rail and wheel engagement for rapid transit traction of the truck; a coupling beam carried by the truck, adapted to articulate with a coupling upon an aircraft; the said fluid pressure means provided with an electrical circuit means in cooperation therewith to control the movement of the truck; an electric controller within the aircraft, adapted to actuate the fluid pressure means for the starting and stopping of the truck and the mean effective take-off of the aircraft from the runway; the take-off of the aircraft actuating the coupling beam and the fluid pressure means in cooperation therewith for automatically stopping the locomobile upon the railway.

6. An aircraft launching apparatus, comprising the conventional elements of a street type tramway and pavement assemblage; provided with traction rails and a rack-rail midway of the gage of the tramway; the said rail elements countersunk in the surface of an aircraft runway; a locomobile adapted to cooperate with the tramrails and rack rail; fluid pressure propulsion means on the locomobile, a coupling beam carried by the locomobile, adapted to engage a coupling on an aircraft; an electrical circuit means carried by the locomobile and the aircraft and controlled from within the aircraft, the circuit articulated by the intervening coupling beam to actuate the fluid pressure means of the locomobile, for the mean effective take-off in launching the aircraft from the runway; the said take-off actuating the coupling beam to automatically apply fluid pressure for braking power for stopping the locomobile upon the railway.

7. An aircraft launching apparatus, comprising a railway countersunk in the surface of an aircraft runway, a locomobile thereon, an aircraft on the runway, fluid pressure means to impart travel to the locomobile; a coupling beam carried by the locomobile, adapted to engage a coupling lug upon the aircraft, an electric circuit controller within the aircraft, the said circuit adapted to be conducted to the locomobile by means of an intervening circuit carried by the coupling beam; the said circuit completed or broken by the contacts upon the coupling beam of the locomobile and the coupling lug upon the aircraft; the said fluid pressure means carried by and for the operation of the locomobile, controlled by the said electric circuit; for the said fluid pressure means to facilitate the rapid transit traction of the locomobile; to actuate the mean effective take-off of the aircraft from the runway and whereby the said take-off actuates the movement of the coupling beam and fluid pressure means in cooperation therewith for the automatic power control of the locomobile upon the railway.

8. In an aircraft launching apparatus, comprising a railway in an airfield runway, a locomobile having a truck for towing movement thereon, an aircraft on the runway; the locomobile truck and aircraft provided with elements of articulation to engage and disengage an intervening coupling beam, disposed between the locomobile and aircraft, for towing the aircraft; the said coupling beam provided with an electrical circuit to control fluid pressure means upon the truck and from within the aircraft; to facilitate rapid traction of the locomobile and aircraft and to thereby impart the mean effective take-off of the aircraft from the runway; the said take-off actuating the coupling beam and fluid pressure means in cooperation therewith to automatically stop the locomobile upon the railway.

9. In an aircraft launching apparatus, a railway in an airfield runway, a launching truck thereon, fluid pressure means for the travel of the truck, a working beam mounted for oscillatory movement upon the truck, a bifurcated coupling terminal and a buffer terminal on the working beam, the coupling terminal adapted to engage with a coupling lug on an aircraft, the buffer terminal adapted to impinge upon the rear wall of the truck to dampen the shock of starting impact of the truck-and-towing of aircraft, the coupling terminal provided with a circuit breaking leverage in common with the working beam to make and break the circuit for remote control from the aircraft to the fluid pressure means to impart travel to the truck, the buffer terminal provided with a control means to supply fluid under pressure to a braking means for stoppage of the truck.

10. In an aircraft launching apparatus, comprising a railway in an airfield runway, a locomobile for launching power thereon; the locomobile having a truck for travel, fluid pressure means for the travel of the truck; a coupling beam pivotally mounted upon the truck for towing aircraft, the said aircraft provided with a lug to interfit with a coupling terminal on one end of the said beam, a shock absorber element upon the other end of the beam; the said beam adapted to recoil and oscillate when towing stress thereon is relaxed; an electrical controlling means comprising a switch within the aircraft, connected to a circuit by way of the towing lug of the aircraft to the locomobile; by means of the intervening coupling beam; an electro-pneumatic valve upon the truck for the control of the fluid pressure for operating the truck, the said valve actuated by the said electrical means for controlling the fluid pressure; to start and stop the truck and to facilitate rapid transit traction of the truck and impart mean effective take-off of the aircraft from the runway; the said take-off actuating the coupling beam and fluid pressure means in cooperation therewith to automatically retard and stop the locomobile upon the railway.

11. In an aircraft launching apparatus, comprising a railway in an airfield runway; the said railway provided with a locomobile having the dual elements for rapid transit, frictional adhesion traction and rack and pinion type traction; and elements complementary to the railway and locomobile to facilitate the dual engagement of the said elements; fluid pressure means to actuate the locomobile, a coupling beam mounted upon the locomobile to engage a coupling lug upon an aircraft; dollies upon the airfield runway adapted to carry the landing wheels of an aircraft; a remote control switch mounted in the aircraft, an electric circuit connecting the switch with the coupling lug of the aircraft; an electro-pneumatic valve upon the locomobile connected by a circuit through the coupling beam and the coupling lug of the aircraft; the remote control switch in the aircraft adapted to actuate the means to impart fluid pressure for the travel of the locomobile when the electric circuit is closed, the said circuit automatically opened by the oscillation of the coupling beam; thereby actuating a fluid pressure means for braking and stopping the truck of the locomobile, after mean effective take-off of the aircraft from the runway.

12. In an aircraft launching apparatus, a railway in an airfield runway, a prime mover supported for travel on the railway, fluid pressure means for the prime mover; an aircraft carried by the dollies on the runway, means upon the prime mover and the aircraft for coupling the prime mover to the aircraft for impact towing movement and to actuate another means for stopping the prime mover; the said coupling means automatically disengaging and shutting off the fluid under pressure to the travelling means of the prime mover and simultaneously feeding fluid under pressure to a braking means for stoppage of the prime mover; the fluid pressure means actuated by an electric circuit, and means in common with the coupling to make and break the circuit, whereby the towing movement is accelerated for impelling the air craft when circuit is made, and prime mover automatically retarded when the circuit is broken.

13. In an aircraft launching apparatus, a railway in an airfield runway, a launching truck upon the railway, a powered aircraft connected by a cable towing line to a motorless aircraft on the runway, the launching truck operably coupled to the motorless aircraft carried by dollies, and automatic winding reel disposed within the powered aircraft for control of slack of the towline in launching and subsequent flight movement, the said winding reel comprising a windlass having standards and pillow blocks, and a journaled shaft carried by the pillow blocks, a winding drum carried by the journals, a fluid pressure winding engine that is freely and operably connected to the winding drum, a tow line winding on the drum, a stop element on the tow line, a shock-absorber in conjunction with the winding drum, means on the shock absorber to control the flow of fluid under pressure to the winding engine by the impact of the stop element upon the shock absorber.

14. In an aircraft launching apparatus, a railway in an airfield runway, a launching truck upon the railway, a powered aircraft connected by a cable towing line to a motorless aircraft upon the runway; dollies upon the runway adapted to transport the motorless aircraft when superposed thereon for launching movement; the launching truck operably coupled to the motorless aircraft, the cable towing line carried in the motorless aircraft by a draft rigging; said rigging comprising a prime mover with a cylinder and a piston and rod therein, the end of the piston rod connected to a lever, the opposite end of the lever having a hook; a swinging locking link pivoted at one end and secured by the hook; a tow line terminal carried by the locking link; fluid under pressure for the prime mover and means operably connected therewith to actuate the prime mover to hold the locking link and cable in a secure position for the towing movement thereof and subsequent release of the cable.

AUGUST GEORGE LIEBMANN.

REFERENCES CITED

The following references are of record in the file of this patent:

UNITED STATES PATENTS

| Number | Name | Date |
| --- | --- | --- |
| 1,272,211 | Cabot | July 9, 1918 |
| 1,803,320 | Christianson | May 5, 1931 |
| 2,135,033 | Courtney | Nov. 1, 1938 |
| 2,181,656 | Fleet et al. | Nov. 28, 1939 |
| 2,366,892 | Donnellan | Jan. 9, 1945 |
| 2,409,552 | Donnellan | Oct. 15, 1946 |